US012656905B2

(12) United States Patent
Weng

(10) Patent No.: US 12,656,905 B2
(45) Date of Patent: Jun. 16, 2026

(54) ELECTRONIC DEVICE

(71) Applicant: CARUX TECHNOLOGY PTE. LTD., Singapore (SG)

(72) Inventor: Tsan-Po Weng, Tainan (TW)

(73) Assignee: CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/736,579

(22) Filed: Jun. 7, 2024

(65) Prior Publication Data

US 2025/0021188 A1     Jan. 16, 2025

(30) Foreign Application Priority Data

Jul. 12, 2023     (CN) .......................... 202310853170.3

(51) Int. Cl.
*G06F 3/041* (2006.01)
*G06F 3/044* (2006.01)
(52) U.S. Cl.
CPC ........ *G06F 3/041662* (2019.05); *G06F 3/044* (2013.01)
(58) Field of Classification Search
CPC ...................................................... G06F 3/044

USPC ........................................................... 345/174
See application file for complete search history.

(56) References Cited

U.S. PATENT DOCUMENTS

2019/0042016 A1* 2/2019 Wang ..................... G06F 3/0443
2020/0110506 A1* 4/2020 Rosenberg .............. G06F 3/046
2023/0039061 A1* 2/2023 Dongbang .......... G06F 3/04164
2023/0339344 A1* 10/2023 Chon ...................... B60L 58/12
2024/0319816 A1* 9/2024 Wu ........................ G06F 3/0412

FOREIGN PATENT DOCUMENTS

CN          113377236          9/2021

* cited by examiner

*Primary Examiner* — Calvin C Ma
(74) *Attorney, Agent, or Firm* — JCIPRNET

(57) ABSTRACT

An electronic device is provided. The electronic device includes a touch panel and a control circuit. The touch panel includes a plurality of sensing lines and a plurality of sensing electrodes. The sensing electrodes are coupled to corresponding sensing lines. The control circuit is coupled to the touch panel through the sensing line. The control circuit includes a first switch circuit. The first switch circuit is configured to control whether at least two sensing lines of the plurality of sensing lines are electrically connected. In the first mode, the first switch circuit electrically connects at least two sensing lines. In the second mode, the first switch circuit electrically disconnects at least two sensing lines.

19 Claims, 11 Drawing Sheets

ELECTRONIC DEVICE

CROSS-REFERENCE TO RELATED APPLICATION

This application claims the priority benefit of China application serial no. 202310853170.3, filed on Jul. 12, 2023. The entirety of the above-mentioned patent application is hereby incorporated by reference herein and made a part of this specification.

BACKGROUND

Technical Field

The disclosure relates to an electronic device, in particular to a touch device.

Description of Related Art

Electronic devices with touch functions can bring convenience to users. However, a conventional electronic device does not change its touch scan timing according to the operation mode. Therefore, no matter whether a touch event occurs or not, electronic devices all use driving signals with the same frequency or amplitude to drive the sensing electrodes to perform touch sensing operations. However, this driving method will make the electromagnetic interference (EMI) energy of the electronic device too high, and increase the power consumption of the electronic device.

SUMMARY

The disclosure provides an electronic device which can reduce power consumption by changing its touch sensing method.

The electronic device of the disclosure includes a touch panel and a control circuit. The touch panel includes a plurality of sensing lines and a plurality of sensing electrodes. The sensing electrodes are coupled to corresponding sensing lines. The control circuit is coupled to the touch panel through the sensing line. The control circuit includes a first switch circuit. The first switch circuit is configured to control whether at least two sensing lines of the plurality of sensing lines are electrically connected. In the first mode, the first switch circuit electrically connects at least two sensing lines. In the second mode, the first switch circuit electrically disconnects at least two sensing lines.

In order for the features and advantages of the disclosure to be more comprehensible, the following specific embodiments are described in detail in conjunction with the drawings.

DESCRIPTION OF THE EMBODIMENTS

Figure 1:
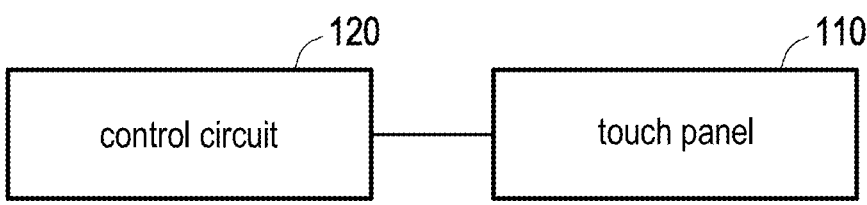
FIG. 1 shows a schematic diagram of an electronic device according to an embodiment of the disclosure.

The disclosure may be understood by referring to the following detailed description in conjunction with the drawings. It should be noted that in order to facilitate the understanding of the reader and the brevity of the drawings, multiple drawings in the disclosure only depict a part of an electronic device, and specific components in the drawings are not drawn according to actual scale. In addition, the number and the size of each component in the drawings are for illustration only and are not intended to limit the scope of the disclosure.

In the following specification and claims, terms such as "containing" and "including" are open-ended terms, so the terms should be interpreted as "containing but not limited to . . . ".

It should be understood that although the terms first, second, third . . . may be used to describe various constituent components, the constituent components are not limited by the terms. The terms are only used to distinguish a single constituent component from other constituent components in the specification. The same terms may not be used in the claims, but are replaced by first, second, third . . . according to the order of declaration of the components in the claims. Therefore, a first constituent component in the specification below may be a second constituent component in the claims.

In some embodiments of the disclosure, terms such as "connection" and "interconnection" related to bonding and connection, unless otherwise specified, may mean that two structures are in direct contact or may also mean that the two structures are not in direct contact, wherein there is another structure disposed between the two structures. The terms related to bonding and connection may also include the case where the two structures are both movable or the two structures are both fixed. In addition, the term "coupling" includes any direct and indirect electrical connection means. In the case of direct electrical connection, terminals of components on two circuits are directly connected or connected to each other by a conductor line segment, and in the case of indirect electrical connection, there is a switch, a diode, a capacitor, an inductor, a resistor, other suitable components, or a combination of the above components between the terminals of the components on the two circuits, but not limited thereto.

The electronic device of the disclosure may include a display device, an antenna device, a sensing device, a light emitting device, or a splicing device, but not limited thereto. The electronic device may include a bendable or flexible electronic device. The electronic device may include an electronic component. The electronic device includes, for example, a liquid crystal layer or a light emitting diode (LED). The electronic component may include a passive component and an active component, such as a capacitor, a resistor, an inductor, a variable capacitor, a filter, a diode, a transistor, a sensor, a microelectromechanical system (MEMS), a liquid crystal chip, a controller, etc, but not limited thereto. The diode may include a light emitting diode or a photodiode. The light emitting diode may, for example, include an organic light emitting diode (OLED), a mini LED, a micro LED, a quantum dot LED, fluorescence, (phosphor), other suitable materials, or a combination of the above, but not limited thereto. The sensor may, for example, include a capacitive sensor, an optical sensor, an electromagnetic sensor, a fingerprint sensor (FPS), a touch sensor, an antenna, a pen sensor, etc., but not limited thereto. The controller may, for example, include a timing controller, etc., but not limited thereto. In the following, the display device will be used as the electronic device to illustrate the disclosure, but the disclosure is not limited thereto.

Reference will now be made in detail to the exemplary embodiments of the disclosure, examples of the exemplary embodiments are illustrated in the drawings. Wherever possible, the same reference numerals are used in the drawings and the description to refer to the same or similar parts.

Figure 2A:
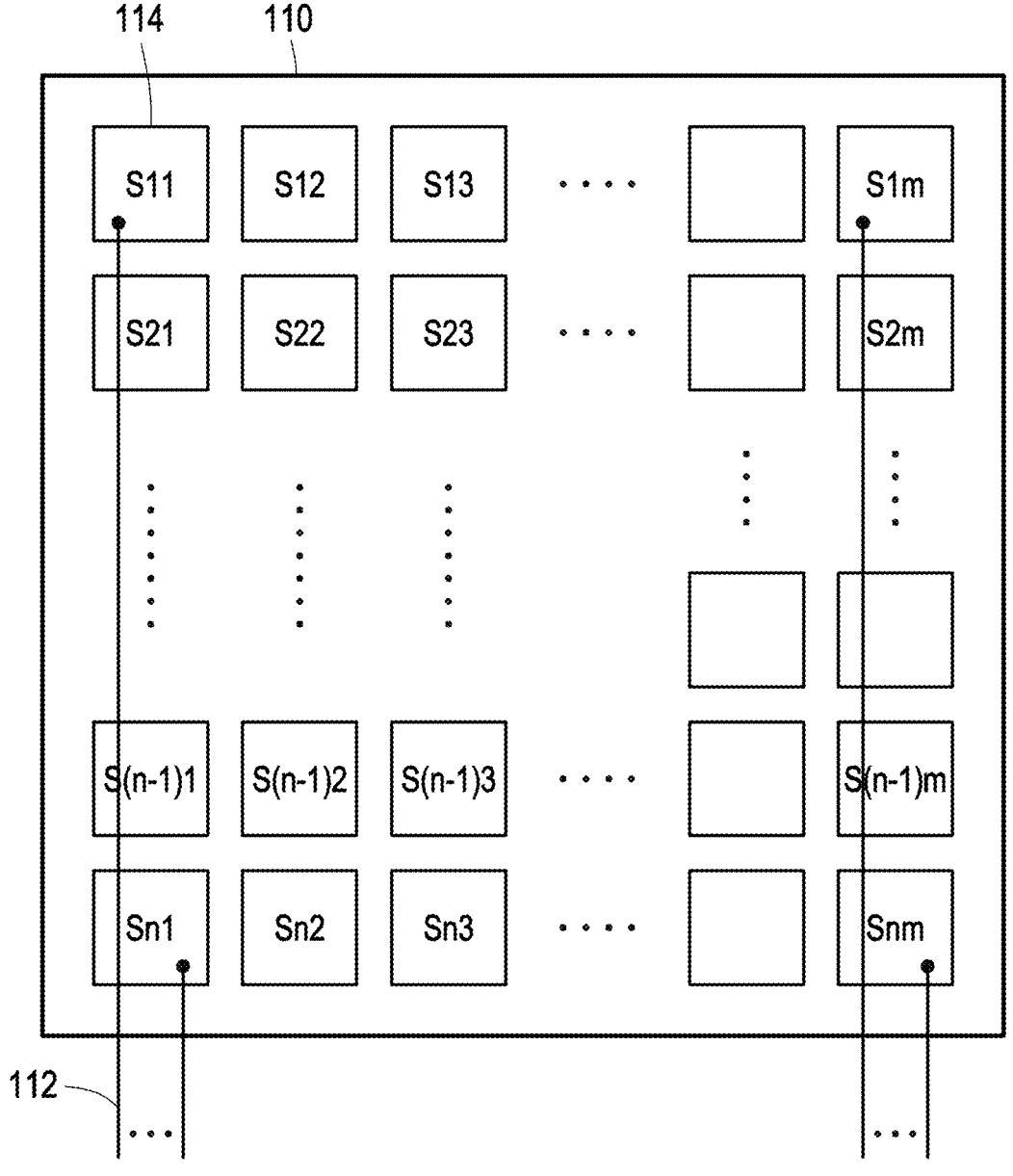
FIG. 2A shows a schematic diagram of the touch panel of the embodiment of FIG. 1.
Figure 2B:
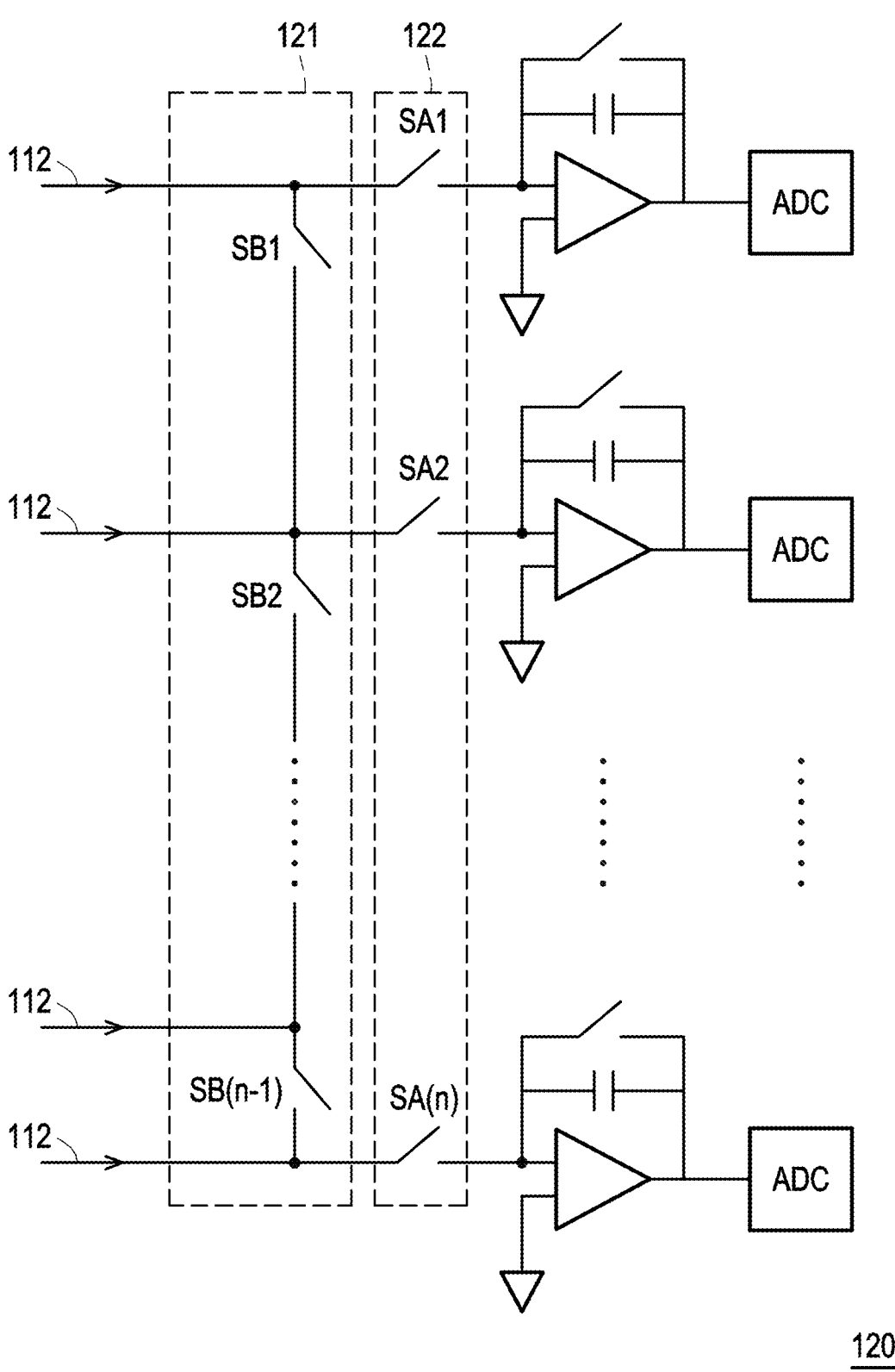
FIG. 2B shows a schematic diagram of the control circuit of the embodiment of FIG. 1.

FIG. 1 shows a schematic diagram of an electronic device according to an embodiment of the disclosure. FIG. 2A shows a schematic diagram of the touch panel of the embodiment of FIG. 1. FIG. 2B shows a schematic diagram of the control circuit of the embodiment of FIG. 1. Referring to FIG. 1, FIG. 2A and FIG. 2B, the electronic device 100 includes a touch panel 110 and a control circuit 120. The control circuit 120 is configured to drive the touch panel 110 to perform a touch sensing operation.

The touch panel 110 includes a plurality of sensing lines 112 and a plurality of sensing electrodes 114. The sensing electrodes 114 are coupled to corresponding sensing lines 112. The control circuit 120 is coupled to the touch panel 110 through the sensing line 112. The control circuit 120 includes a first switch circuit 121 and a second switch circuit 122. The first switch circuit 121 is configured to control whether at least two sensing lines of the sensing line 112 are electrically connected. The first switch circuit 121 includes first switch elements SB1, SB2 to SB(n−1), wherein n is an integer greater than 2. For example, the first switch element SB1 is configured to control whether the two sensing lines 112 connected thereto are electrically connected. The control circuit 120 is coupled to the sensing line 112 through the second switch circuit 122. The second switch circuit 122 is configured to control whether the sensing line 112 is electrically connected to the control circuit 120. The second switch circuit 122 includes second switch elements SA1, SA2 to SA(n). When the second switch elements SA1, SA2 to SA(n) are turned on, the control circuit 120 receives a sensing signal from the touch panel 110.

The sensing circuit shown in FIG. 2B is an embodiment of the control circuit 120 for receiving sensing signals output by the first column sensing electrodes S11, S21 to Sn1. The control circuit 120 may include a plurality of sensing circuits as shown in FIG. 2B for sensing sensing signals output by sensing electrodes in other columns. In addition, the circuit marked as ADC in FIG. 2B is an analog-to-digital conversion circuit for converting an analog sensing signal into a digital sensing signal for the next-level circuit to perform touch sensing operations.

In this embodiment, the electronic device 100 includes a standby mode (first mode) and a normal mode (second mode). In the standby mode, the first switch circuit 121 electrically connects at least two sensing lines 112 to group the sensing electrodes 114 to perform a mutual capacitive touch sensing operation. In the normal mode, the first switch circuit 121 electrically disconnects at least two sensing lines 112 for self-capacitive touch sensing operation.

Figure 3:
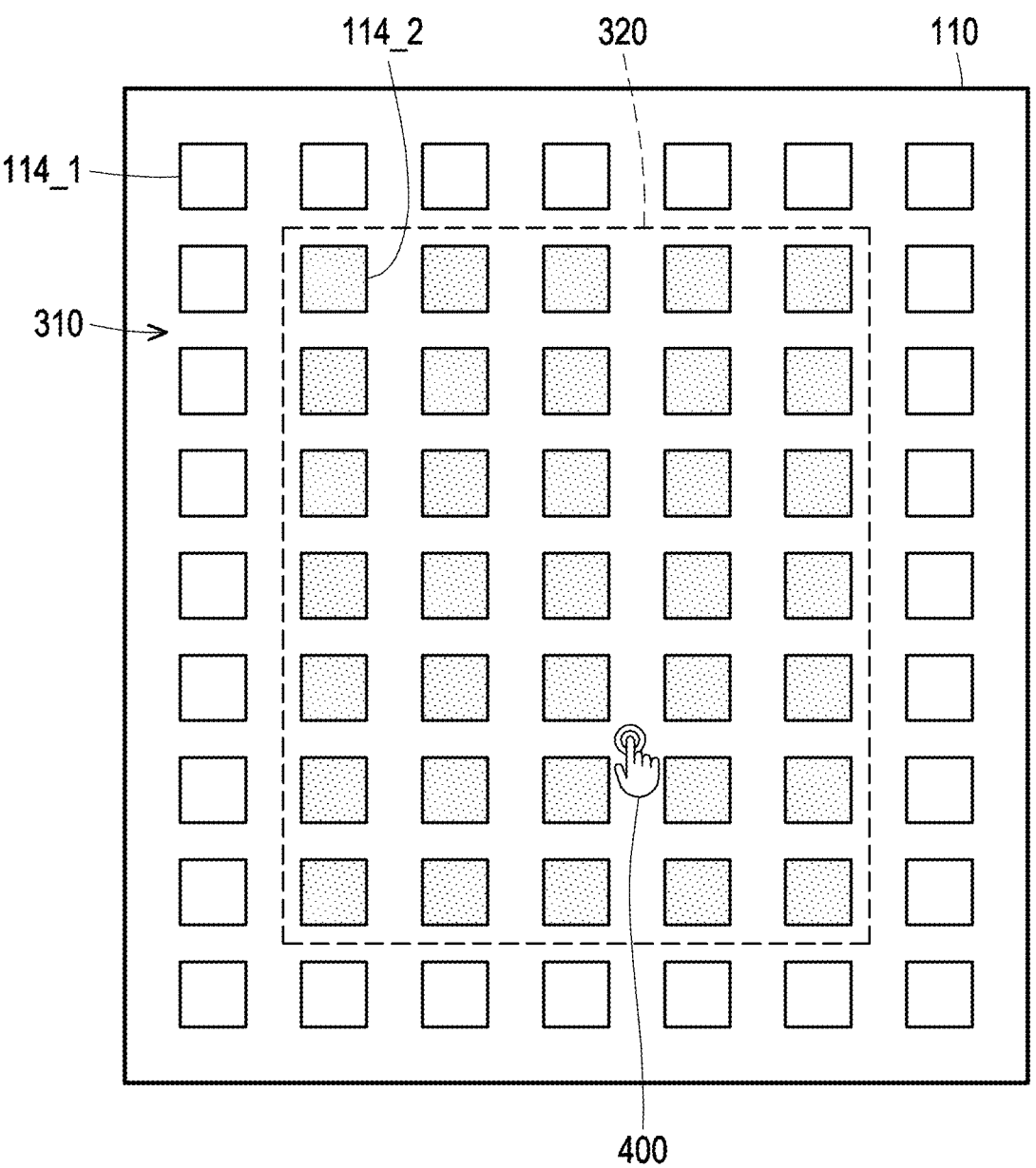
FIG. 3 shows a schematic diagram of a touch panel operating in a standby mode according to an embodiment of the disclosure.
Figure 4:
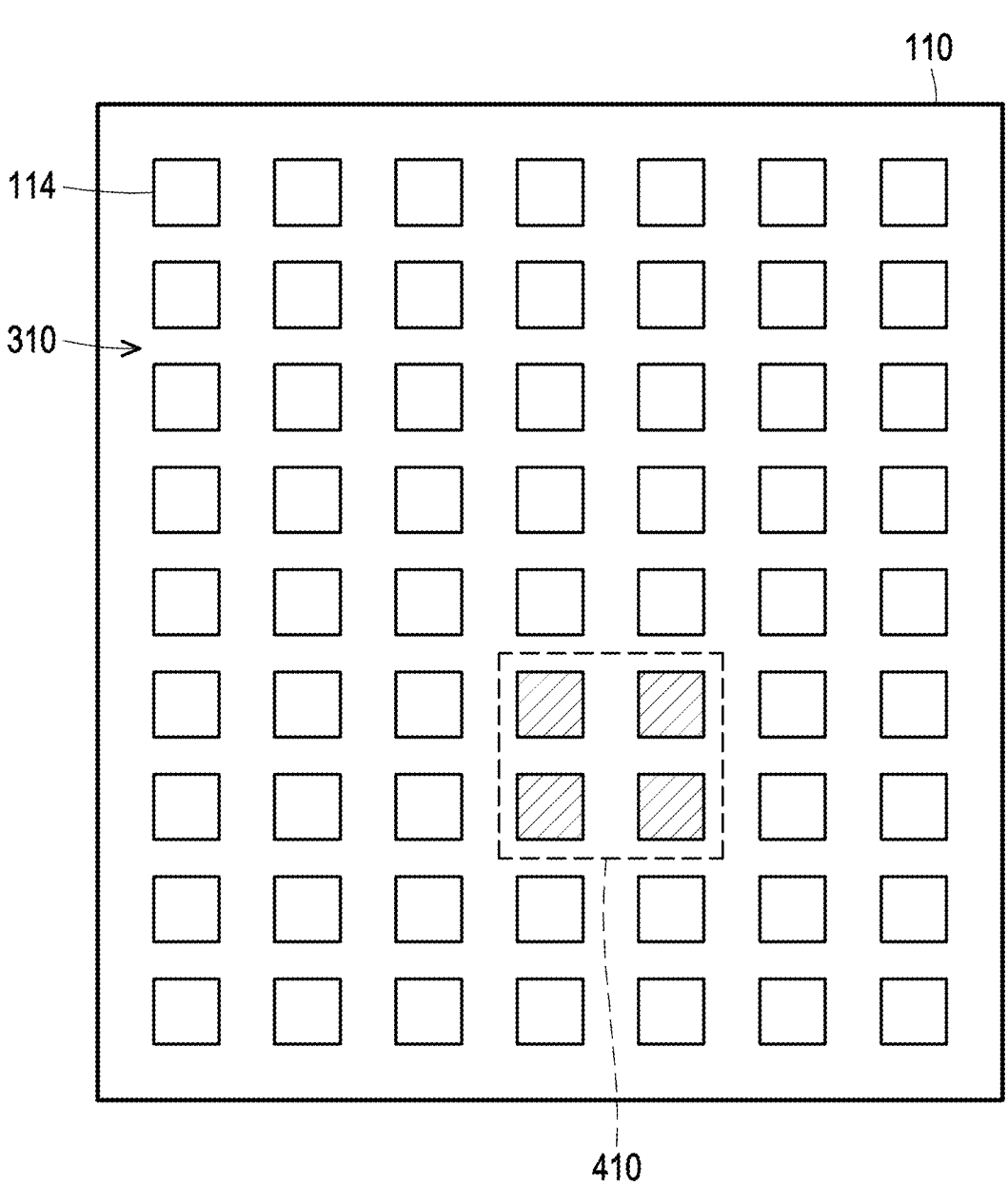
FIG. 4 shows a schematic diagram of a touch panel operating in a normal mode according to an embodiment of the disclosure.

Specifically, FIG. 3 shows a schematic diagram of a touch panel operating in a standby mode according to an embodiment of the disclosure, and FIG. 4 shows a schematic diagram of a touch panel operating in a normal mode according to an embodiment of the disclosure. Referring to FIG. 3 and FIG. 4. In FIG. 3, the touch panel 110 includes a first area 310 and a second area 320 adjacent to the first area 310. The second area 320 surrounds the first area 310. A part of the sensing electrodes 114_1 of the sensing electrodes 114 is disposed in the first area 310, and another part of the sensing electrodes 114_2 of the sensing electrodes 114 is disposed in the second area 320. In the standby mode, the control circuit 120 controls the first switch circuit 121 to electrically connect the sensing lines 112 corresponding to the sensing electrodes 114_1 disposed in the first area 310 to each other, and the sensing lines 112 corresponding to the sensing electrodes 114_2 disposed in the second area 320 are electrically connected to each other. Therefore, in the standby mode, the first switch circuit 121 is turned on, and the second switch circuit 122 is not turned on, the sensing electrodes 114 can be divided into a first group of sensing electrodes 114_1 disposed in the first area 310 and a second group of sensing electrodes 114_2 disposed in the second area 320. In this way, in the standby mode, the touch panel 110 can conduct a preliminary scan on whether an object (such as a user's finger or a touch pen) 400 approaches or touches, so as to determine the area 410 approached or touched by the object 400. In the standby mode, the control circuit 120 may, for example, drive the touch panel 110 to perform a preliminary scan with a driving signal with a lower frequency or lower amplitude, so as to reduce power consumption of the electronic device 100 in the standby mode.

Next, after the control circuit 120 determines that an object 400 approaches or touches the area 410, the control circuit 120 controls the electronic device 100 to enter the normal mode. In the normal mode, the first switch circuit 121 is not turned on, and the second switch circuit 122 corresponding to the touch area 410 is turned on sequentially, therefore, the sensing line 112 corresponding to the touch area 410 can transmit the sensing signal to the control circuit 120. In this way, in the normal mode, the touch panel 110 can scan the object 400 with high resolution to determine the touch point that the object 400 approaches or touches. In the standby mode, the control circuit 120 can drive the touch panel 110 to perform high-resolution scanning, for example, with a driving signal of higher frequency or higher amplitude. Since the control circuit 120 scans the touch area 410, the power consumption of the electronic device 100 in the normal mode can also be reduced.

Figure 5:
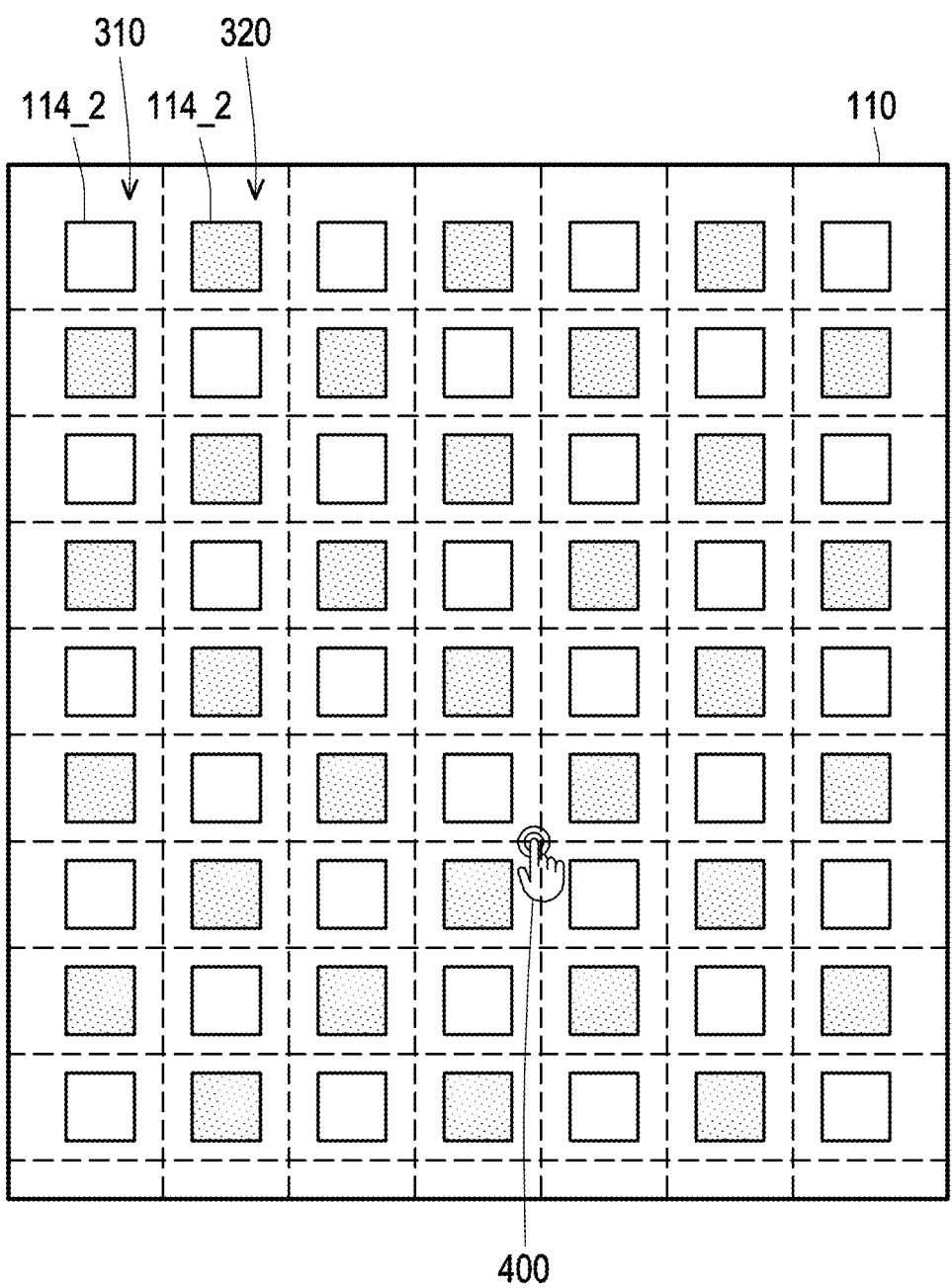
FIG. 5 shows a schematic diagram of a touch panel operating in a standby mode according to another embodiment of the disclosure.

In this embodiment, FIG. 3 is an illustration illustrating that the second area 320 surrounds the first area 310, but the disclosure is not limited thereto. FIG. 5 shows a schematic diagram of a touch panel operating in a standby mode according to another embodiment of the disclosure. Referring to FIG. 5, in the embodiment shown in FIG. 5, the first area 310 and the second area 320 are arranged alternately.

In an embodiment, the electronic device 100 further includes a display panel (not shown), the display panel and the touch panel 110 are integrated into a TID (Touch in Display) embedded touch display panel, that is, the touch panel 110 is disposed in the display panel. Or, in another embodiment, the display panel and the touch panel 110 are integrated into a TOD (Touch Panel On Display) in-cell touch display panel, that is, the touch panel 110 is disposed on the display panel.

Figure 6:
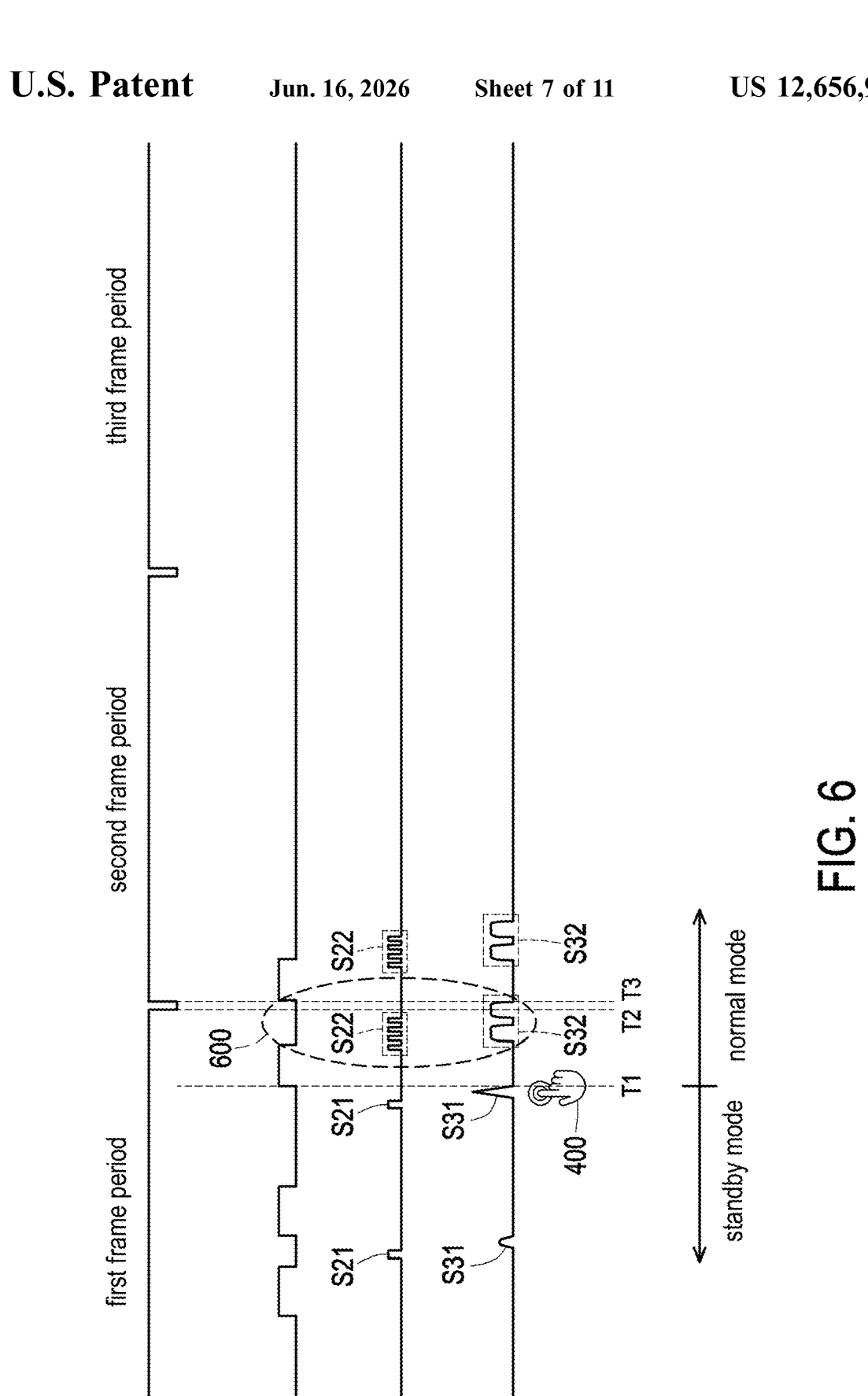
FIG. 6 shows a waveform diagram of various signals of an electronic device according to an embodiment of the disclosure.

FIG. 6 shows a waveform diagram of various signals of the electronic device according to an embodiment of the disclosure. Referring to FIG. 1 and FIG. 6, the signal VS is a vertical synchronization signal, and its high level period is a frame period, and FIG. 6 shows a first frame period, a second frame period and a third frame period. The signal S1 shows display timing, and the electronic device performs a display operation during its high level period. The signal S2 is a touch driving signal output by the control circuit 120 to the touch panel 110 to drive the touch panel 110 to perform a touch operation. The signal S3 is a touch sensing signal output from the touch panel 110 to the control circuit 120.

In the standby mode, the control circuit 120 outputs the first driving signal S21 to drive the sensing electrodes 114 to perform a preliminary scan on whether an object 400 approaches or touches, so as to determine the touch area 410. Next, in the standby mode, the control circuit 120 receives the first sensing signal S31. When the signal amplitude of the first sensing signal S31 is greater than the threshold, the control circuit 120 switches the electronic device 100 from the standby mode to the normal mode. For example, at time T1, the object 400 approaches or touches the touch panel 110. At this time, the signal amplitude of the first sensing signal S31 will be greater than the threshold, and thus, the control circuit 120 switches the electronic device 100 from the standby mode to the normal mode.

In the normal mode, the control circuit 120 outputs the second driving signal S22 to drive the sensing electrodes 114 to scan the touch area 410 with high resolution. Next, in the normal mode, the control circuit 120 receives the second sensing signal S32 to determine the touch point approached or touched by the object 400. In this embodiment, the second sensing signal S32 is distributed in the first frame period and the second frame period adjacent to the first frame period, and overlaps with the falling edge or the rising edge of the frame period in time. As indicated by reference numeral 600, the falling edge of the second sensing signal S32 overlaps with the falling edge of the first frame period and the rising edge of the second frame period at time T2 and T3 respectively. This distribution of sensing signals does not affect the touch operation and/or display operation of the electronic device 100.

Figure 7:
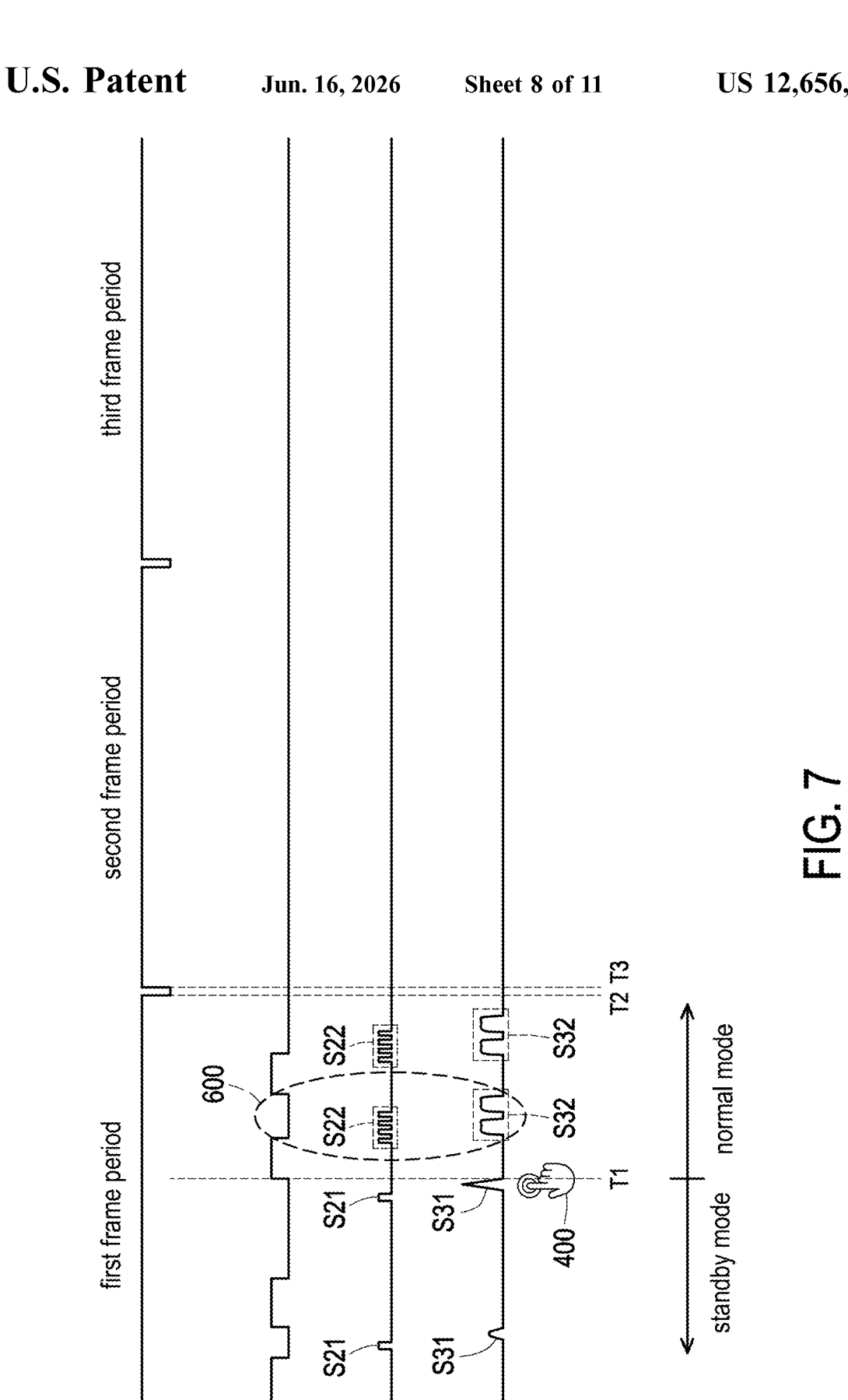
FIG. 7 shows a waveform diagram of various signals of an electronic device according to another embodiment of the disclosure.

In an embodiment, the second sensing signal S32 may also only be distributed during the first frame period. FIG. 7 shows a waveform diagram of various signals of an electronic device according to another embodiment of the disclosure. Referring to FIG. 7, in FIG. 7, the second sensing signal S32 is distributed in the first frame period, and the second sensing signal S32, the falling edge of the first frame period and the rising edge of the second frame period do not overlap in time. In addition, in this embodiment, the first sensing signal S31 and the second sensing signal S32 are distributed in the same frame period, that is, the first frame period.

Figure 8:
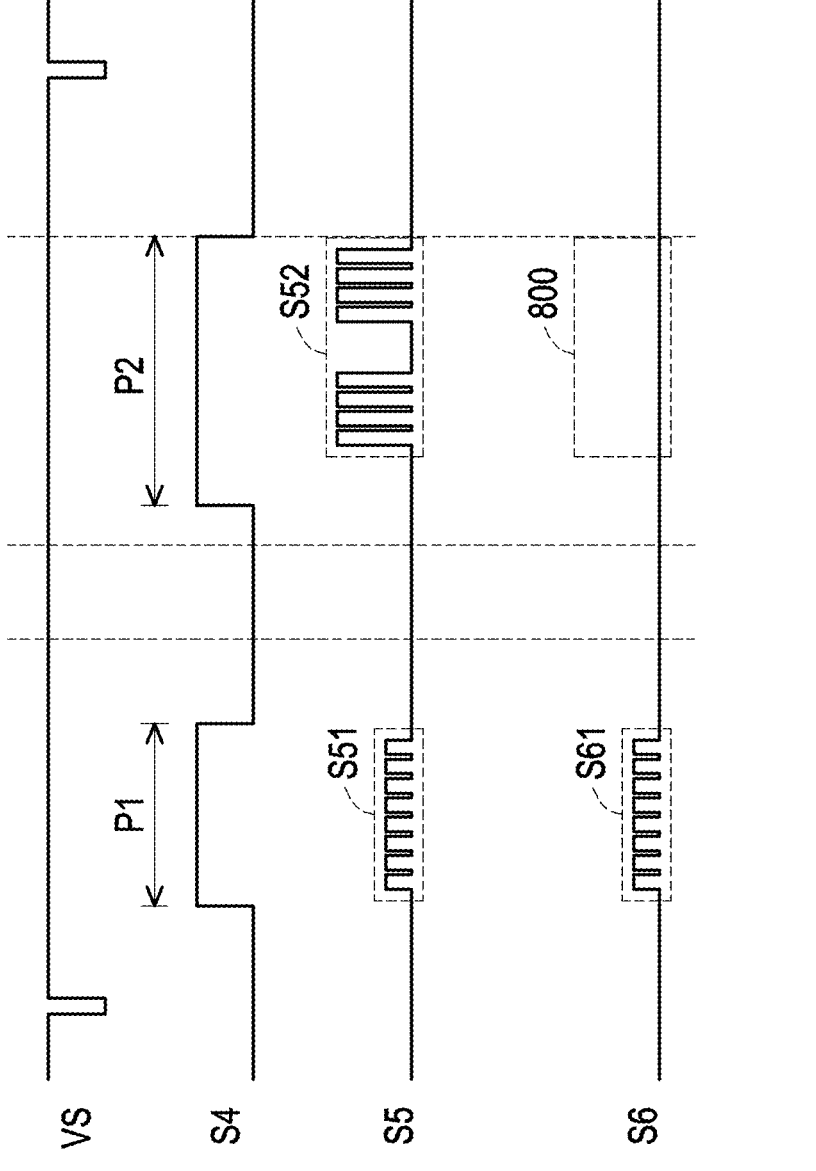
FIG. 8 shows a schematic waveform diagram of a driving signal of an electronic device according to an embodiment of the disclosure.

FIG. 8 shows a waveform diagram of a driving signal of an electronic device according to an embodiment of the disclosure. Referring to FIG. 1 and FIG. 8, the signal S4 is configured to indicate the operation mode of the electronic device 100. The signal S5 is a driving signal output by the control circuit 120 to the touch area 410 of the touch panel

110. The signal S6 is a driving signal output by the control circuit 120 to the non-touch areas on the touch panel 110 other than the touch area 410.

In the standby mode P1, the control circuit 120 outputs first driving signals S51 and S61 to drive the sensing electrodes 114 to perform a preliminary scanning. In the normal mode P2, the control circuit 120 outputs the second driving signal S52 to drive the sensing electrodes 114 corresponding to the touch area 410. In this embodiment, the amplitude of the first driving signal S51 and S61 is lower than the amplitude of the second driving signal S52, so as to reduce the power consumption of the electronic device 100 in the standby mode P1. In addition, in this embodiment, in the normal mode P2, the control circuit 120 does not output a driving signal to the sensing electrode 114 corresponding to the non-touch area, as shown by reference numeral 800, and the power consumption of the electronic device 100 in the normal mode P2 is reduced.

Figure 9:
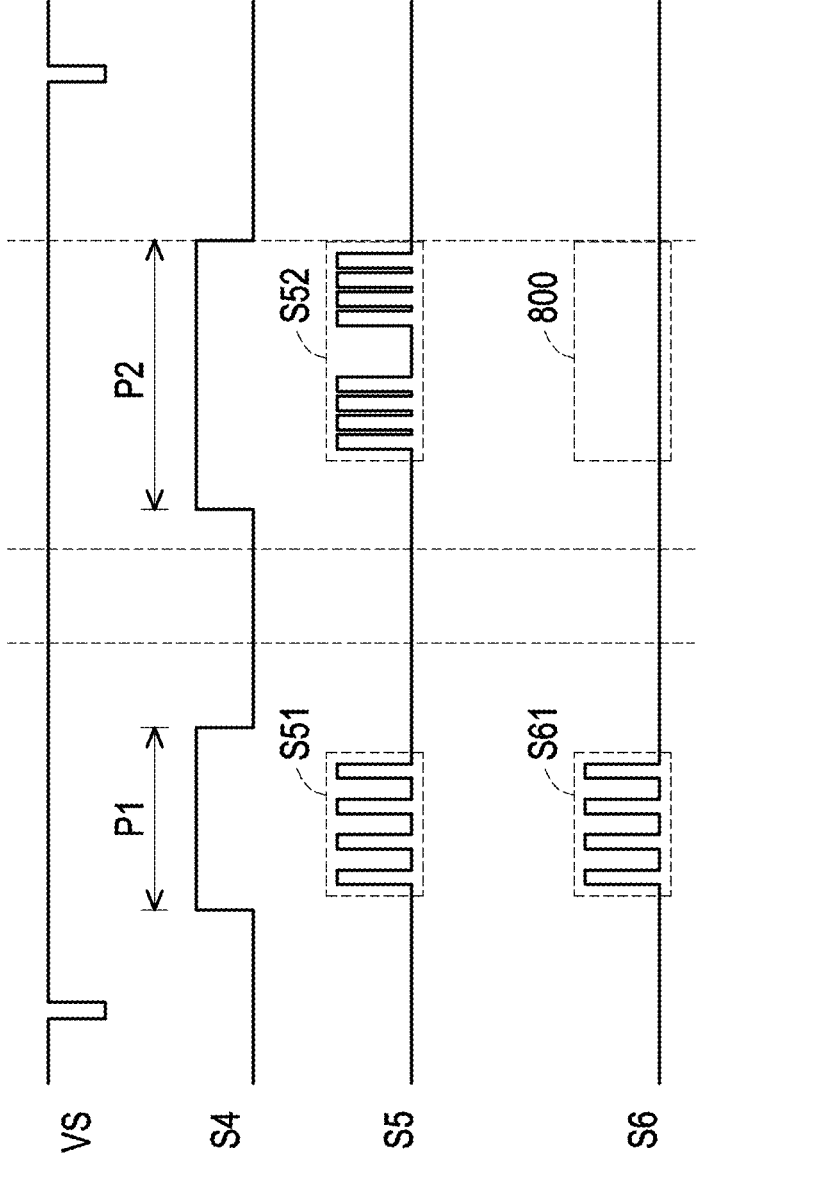
FIG. 9 shows a schematic waveform diagram of a driving signal of an electronic device according to another embodiment of the disclosure.

FIG. 9 shows a waveform diagram of a driving signal of an electronic device according to another embodiment of the disclosure. Referring to FIG. 9, in this embodiment, the frequency of the first driving signals S51, S61 is lower than the frequency of the second driving signal S52, so as to reduce the power consumption of the electronic device 100 in the standby mode P1.

The following describes how the electronic device according to the embodiment of the disclosure is combined with the vehicle host in different usage modes. The vehicle host can intelligently and dynamically control the touch operation of the electronic device to achieve the purpose of energy saving and carbon reduction.

Figure 10:
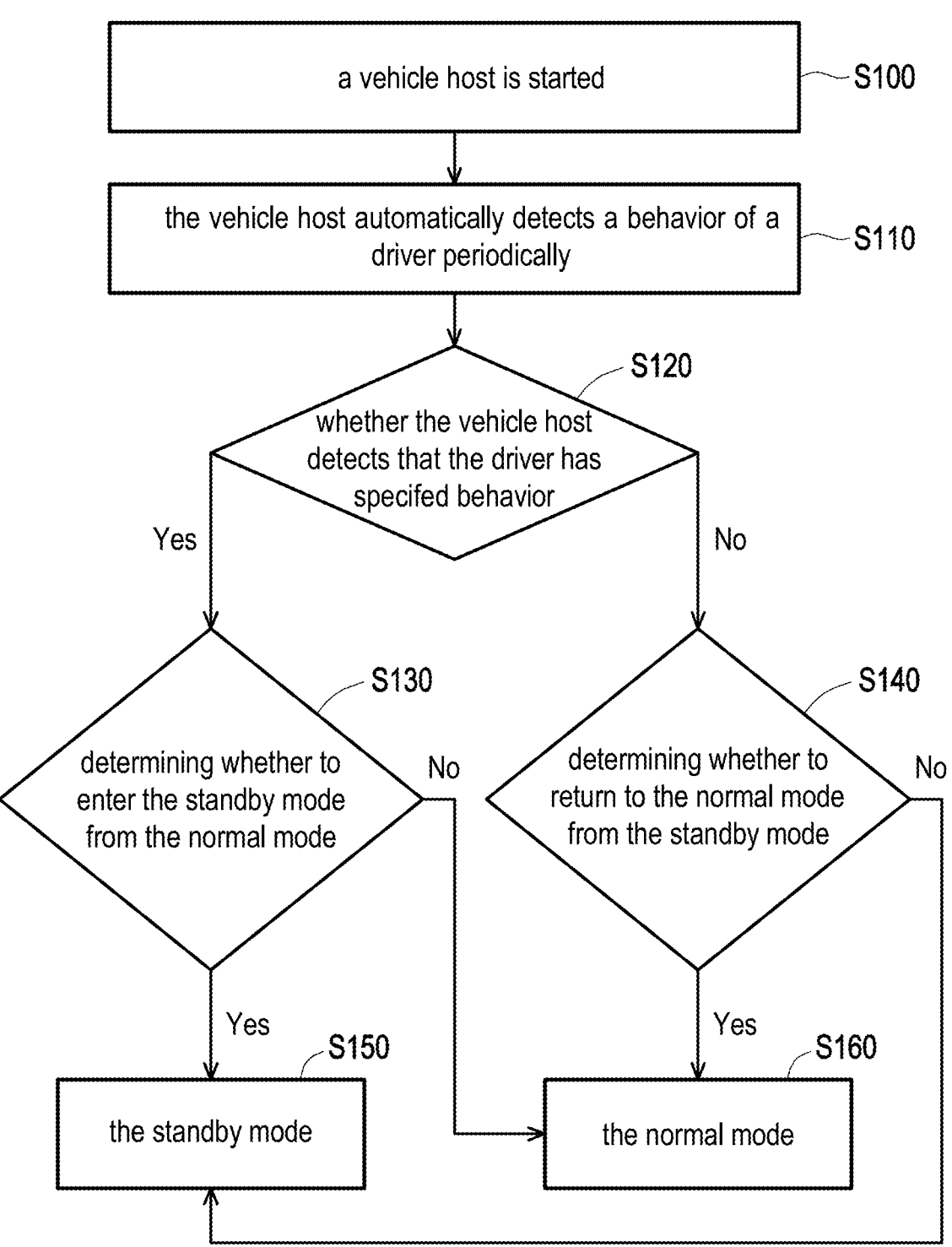
FIG. 10 shows a flow chart of the application of the electronic device combined with the vehicle host according to an embodiment of the disclosure.

FIG. 10 shows a flow chart of the application of the electronic device combined with the vehicle host according to the embodiment of the disclosure. Referring to FIG. 10, in step S100, the vehicle host is started. In step S110, the vehicle host automatically detects the behavior of the driver periodically. The behavior of the driver detected by the vehicle host includes but is not limited to the driver's preparation to open the door for a short time, the driver's preparation for backing up, the driver's stop driving, and a short stop for a rest.

In step S120, if the vehicle host detects that the driver has the above behavior and the electronic device 100 is currently in the normal mode, the method flow will enter step S130. In step S130, the vehicle host will determine whether to enter the standby mode from the normal mode. If the vehicle host determines to enter the standby mode, it will notify the electronic device 100 so that the control circuit 120 controls the electronic device 100 to enter the standby mode (step S150). If the vehicle host determines that it is not necessary to enter the standby mode, it will notify the electronic device 100 so that the control circuit 120 controls the electronic device 100 to stay in the normal mode (step S160).

In step S120, if the vehicle host does not detect the above behavior of the driver and the electronic device 100 is currently in the standby mode, the method flow will enter into step S140. In step S140, the vehicle host determines whether to return to the normal mode from the standby mode. If the vehicle host determines to return to the normal mode, it will notify the electronic device 100 so that the control circuit 120 controls the electronic device 100 to return to the normal mode (step S160). If the vehicle host determines that it is not necessary to return to the normal mode, it will notify the electronic device 100 so that the control circuit 120 controls the electronic device 100 to stay in the standby mode (step S150).

In the application where the electronic device 100 is combined with the vehicle host, due to the low noise and high signal-to-noise ratio in the car, the debounce operation time can be canceled to speed up the operation of the electronic device 100.

To sum up, in the embodiment of the disclosure, in the standby mode, the electronic device can save energy and quickly respond to whether there is an object approaching or touching, and switch to the normal mode. In areas where no objects touch, the electronic device reduces the frequency or amplitude of the driving signal to reduce electromagnetic interference energy and power consumption. In areas touched by objects, the electronic device uses the same frequency or amplitude as the original driving signal to maintain performance. In addition, in the application where the electronic device is combined with the vehicle host, the vehicle host detects the behavior of the driver to determine the operating state of the electronic device, which can reduce the power consumption of the electronic device. Therefore, in the context of different usage patterns, the vehicle host can intelligently and dynamically control the touch operation of the electronic device to achieve the purpose of energy saving and carbon reduction.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments may still be modified or some or all of the technical features thereof may be equivalently replaced. However, the modifications or replacements do not cause the essence of the corresponding technical solutions to deviate from the scope of the technical solutions of the embodiments of the disclosure.

What is claimed is:

1. An electronic device, comprising:
a touch panel, comprising a plurality of sensing lines and a plurality of sensing electrodes, wherein the plurality of sensing electrodes are coupled to the corresponding plurality of sensing lines; and
a control circuit coupled to the touch panel through the plurality of sensing lines, and the control circuit comprises a first switch circuit,
wherein the first switch circuit is configured to control whether at least two sensing lines of the plurality of sensing lines are electrically connected, and in the first mode, the first switch circuit electrically connects the at least two sensing lines to group the plurality of sensing electrodes to perform a mutual capacitive touch sensing operation, and in the second mode, the first switch circuit electrically disconnects the at least two sensing lines for self-capacitive touch sensing operation.

2. The electronic device according to claim 1, wherein the control circuit further comprises a second switch circuit, and the control circuit is coupled to the plurality of sensing lines through the second switch circuit, and the second switch circuit is configured to control whether the plurality of sensing lines are electrically connected to the control circuit.

3. The electronic device according to claim 2, wherein in the first mode, the first switch circuit is turned on, and the second switch circuit is not turned on.

4. The electronic device according to claim 2, wherein in the second mode, the first switch circuit is not turned on, and the second switch circuit is turned on sequentially.

5. The electronic device according to claim 1, further comprising a display panel, wherein the touch panel is disposed in the display panel.

6. The electronic device according to claim 1, further comprising a display panel, wherein the touch panel is disposed on the display panel.

7. The electronic device according to claim 1, wherein the touch panel comprises a first area and a second area adjacent to the first area, a part of the sensing electrodes of the plurality of sensing electrodes is arranged in the first area, and another part of the sensing electrodes of the plurality of sensing electrodes is arranged in the the second area.

8. The electronic device according to claim 7, wherein in the first mode, the plurality of sensing lines corresponding to the part of the sensing electrodes disposed in the first area are electrically connected to each other, and the plurality of sensing lines corresponding to the other part of sensing electrodes disposed in the second area are electrically connected to each other.

9. The electronic device according to claim 7, wherein the second area surrounds the first area.

10. The electronic device according to claim 7, wherein the first area and the second area are alternately arranged.

11. The electronic device according to claim 1, wherein in the first mode, the control circuit receives a first sensing signal, and in the second mode, the control circuit receives a second sensing signal,
when a signal amplitude of the first sensing signal is greater than a threshold, the control circuit switches from the first mode to the second mode.

12. The electronic device according to claim 11, wherein the second sensing signal is distributed in a first frame period and a second frame period adjacent to the first frame period.

13. The electronic device according to claim 11, wherein the second sensing signal is distributed during the first frame period.

14. The electronic device according to claim 11, wherein the first sensing signal and the second sensing signal are distributed in a same frame period.

15. The electronic device according to claim 1, wherein in the first mode, the control circuit outputs a first driving signal to drive the plurality of sensing electrodes, and in the second mode, the control circuit outputs a second driving signal to drive the plurality of sensing electrodes; and
an amplitude of the first driving signal is lower than an amplitude of the second driving signal.

16. The electronic device according to claim 1, wherein in the first mode, the control circuit outputs a first driving signal to drive the plurality of sensing electrodes, and in the second mode, the control circuit outputs a second driving signal to drive the plurality of sensing electrodes; and
a frequency of the first driving signal is lower than a frequency of the second driving signal.

17. An operation method of a vehicle host, wherein the vehicle host comprises an electronic device including a touch panel and a control circuit coupled to the touch panel through a plurality of sensing lines, the control circuit including a first switch circuit, and the operation method comprising:
starting a vehicle host;
performing, by the control circuit via the plurality of sensing lines, a touch sensing operation to periodically detecting a behavior of a driver;

in response to detecting the behavior of the driver while the electronic device is in a standby mode, controlling the first switch circuit to electrically connect at least two of the plurality of sensing lines so as to group a plurality of sensing electrodes, and performing a mutual capacitive touch sensing operation to determine whether the electronic device enters a normal mode from the standby mode; and in response to not detecting the behavior of the driver while the electronic device is in the normal mode, controlling the first switch circuit to electrically disconnect the at least two sensing lines, and performing a self-capacitance touch sensing operation to determine whether the electronic device returns to the standby mode from the normal mode.

18. The operation method of the vehicle host according to claim 17, further comprising:

if it is determined that the electronic device is going to enter the standby mode, notifying, by the vehicle host, the electronic device to enter the standby mode; and if it is determined that the electronic device does not want to enter the standby mode, notifying, by the vehicle host, the electronic device to stay in the normal mode.

19. The operation method of the vehicle host according to claim 17, further comprising:

if it is determined that the electronic device will return to the normal mode, notifying, by the vehicle host, the electronic device to return the electronic device to the normal mode; and if it is determined that the electronic device does not want to return to the normal mode, notifying, by the vehicle host, the electronic device to stay in the standby mode.

* * * * *